Jan. 12, 1932.  E. M. RAYBURN ET AL  1,840,868
POWER TRANSMISSION APPARATUS
Original Filed Nov. 11, 1924   3 Sheets-Sheet 1
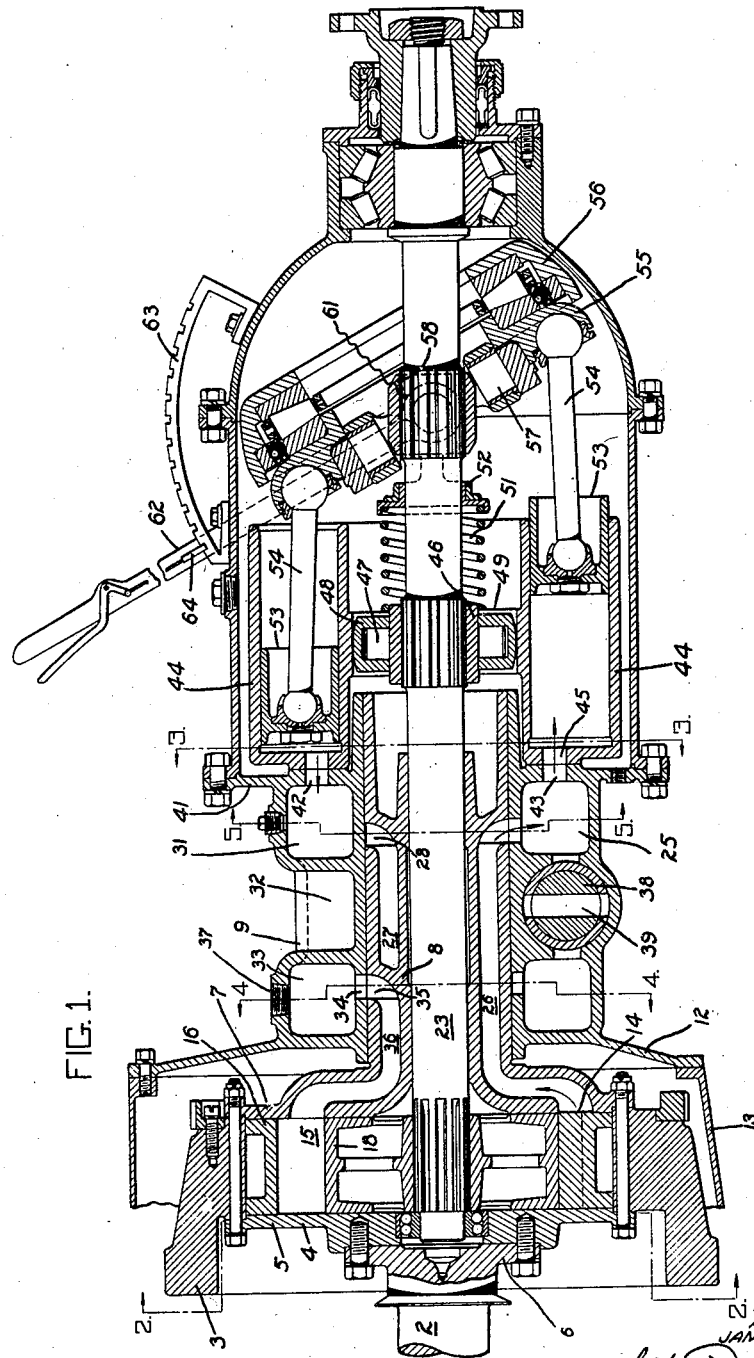
INVENTORS
ELWYN M. RAYBURN.
ALDEN G. RAYBURN.
JAMES WAYNE SUMNER.
BY White Prost Evans
their ATTORNEYS.

Jan. 12, 1932.  E. M. RAYBURN ET AL  1,840,868
POWER TRANSMISSION APPARATUS
Original Filed Nov. 11, 1924   3 Sheets-Sheet 2

INVENTORS
ELWYN M. RAYBURN.
ALDEN G. RAYBURN.
JAMES WAYNE SUMNER.
BY White Frost Evans
ATTORNEYS.

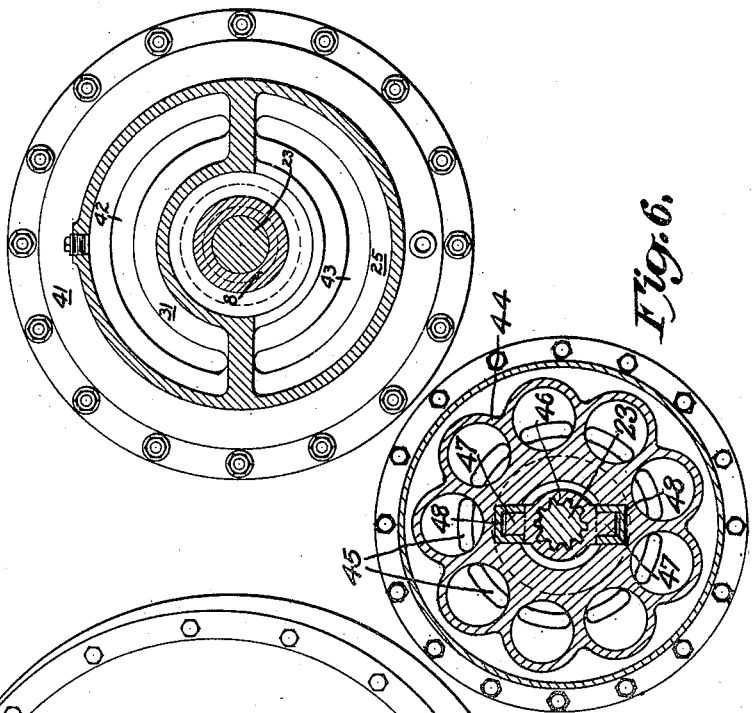
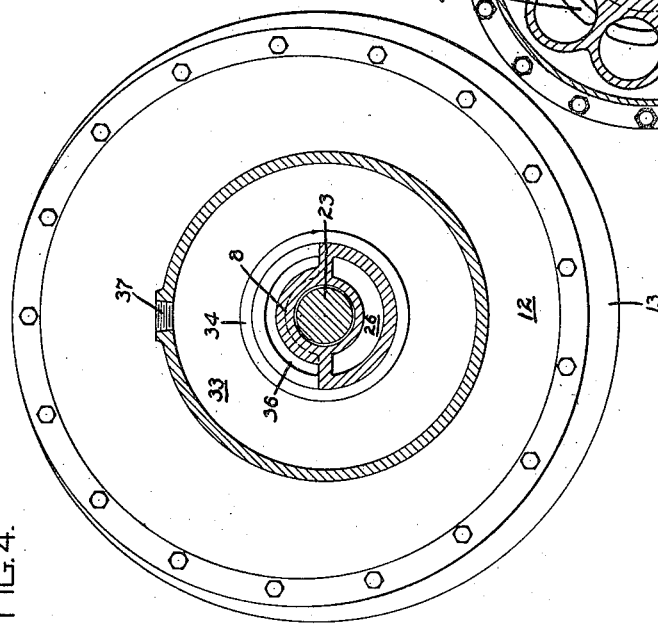

Patented Jan. 12, 1932

1,840,868

UNITED STATES PATENT OFFICE

ELWYN M. RAYBURN AND ALDEN GRANVILLE RAYBURN, OF SAUSALITO, AND JAMES WAYNE SUMNER, OF LOS ANGELES, CALIFORNIA, ASSIGNORS, BY MESNE ASSIGNMENTS, OF FIFTY-ONE PER CENT TO AUTOMOTIVE ENGINEERING CORPORATION, A CORPORATION OF DELAWARE

POWER TRANSMISSION APPARATUS

Application filed November 11, 1924, Serial No. 749,158. Renewed September 22, 1928.

The invention relates to hydraulic power transmissions in which power is transferred from a driving shaft to a driven shaft through the medium of a substantially non-compressible liquid.

An object of the invention is to provide a hydraulic power transmission which is efficient in operation and simple in construction.

Another object of the invention is to provide a hydraulic power transmission the construction of which makes it possible to transmit large horsepowers with a minimum pressure per square inch, and a minimum weight of parts.

Another object of the invention is to provide a hydraulic power transmission in which the speed of the driven shaft may be varied with respect to the speed of the driving shaft.

A further object of the invention is to provide a hydraulic power transmission in which substantially all of the energy delivered by the driving shaft is transmitted to the driven shaft.

The invention possesses other advantageous features, some of which, with the foregoing, will be set forth in the following description, where we shall outline in full that form of the invention which we have selected for illustration in the drawings accompanying and forming part of the present specification. In said drawings we have shown one form of hydraulic power transmission apparatus embodying our invention, but it is to be understood that we do not limit ourselves to such form, since the invention, as set forth in the claims, may be embodied in a plurality of forms.

Referring to said drawings:

Figure 1 is a longitudinal vertical section through a hydraulic power transmission apparatus embodying our invention with certain of the valving ports, as will more fully appear hereinafter, shifted from their true positions for clarity of illustration.

Figure 4 is a cross section taken on the line 4—4 Figure 1.

Figure 5 is a cross section taken on the line 5—5 Figure 1 with the semi-circular valving ports shifted angularly approximately ninety degrees from their true positions, in order to agree with the distorted showing in Figure 1.

Figure 6 is a vertical cross section taken on Figure 1 through the coupling between the driven shaft and the motor cylinders.

Figure 3:
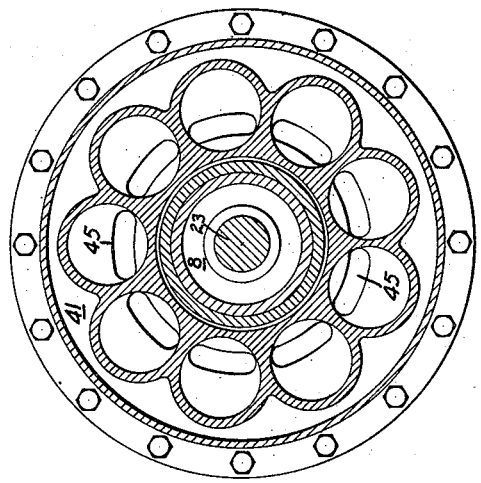
Figure 3 is a cross section taken on the line 3—3 Figure 1.
Figure 2:
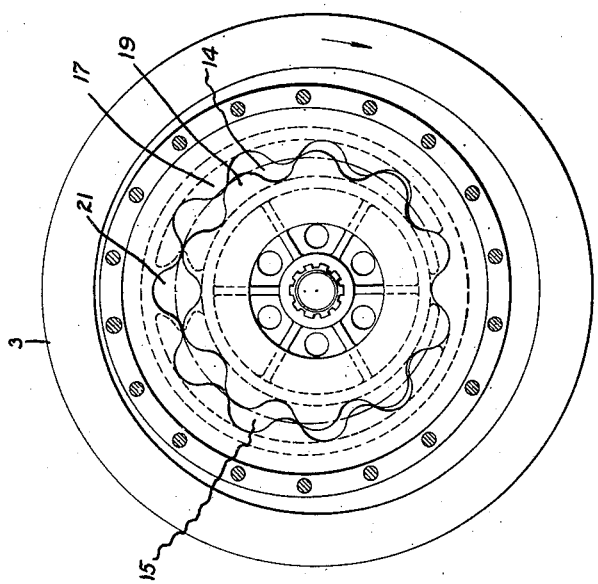
Figure 2 is a cross section taken on the line 2—2 Figure 1.

The apparatus comprises a driving shaft adapted to be connected to a prime mover, such as an internal combustion engine and may comprise the crank shaft of such engine, and a driven shaft which is flexibly connected to the driving shaft by a fluid medium. The driven shaft is adapted to be connected to the instrumentality to be driven, such as the driving wheels of a vehicle or the propeller shaft of a vessel, or other instrumentality to be driven. In the form of the apparatus disclosed in the drawings, the flexibility of the connection between the driving and driven shafts may be varied at will, to vary the ratio of the speed of the two shafts. The driving and driven shafts may rotate in synchronism or the speed of rotation of the driven shaft may be less than the speed of rotation of the driving shaft, depending upon the adjustment of the apparatus. The fluid displaced by the relative rotation of the driving shaft with respect to the driven shaft is employed to do useful work in rotating the driven shaft, so that the torque of the driven shaft is varied with the speed ratio. When the apparatus is adjusted to cause synchronous rotation of the two shafts, the torque of the driven shaft is the same as the torque of the driving shaft, and as the adjustment is varied to reduce the speed of the driven shaft with respect to the speed of rotation of the driving shaft, the torque of the driven shaft is increased over that of the driving shaft, the increase in torque depending upon the difference in speed of the two shafts.

The apparatus of our invention comprises a fluid pump of the rotary type, the casing of the pump being secured to the driving shaft and the rotor of the pump being secured to the driven shaft. The liquid pumped is conducted from the pump to a motor which is attached to the driven shaft so that the speed of the rotor is determined by the speed of the motor. With the pump rotor held stationary, the pump has a fixed fluid displacement per revolution thereof and, as the rotor rotates, this fluid displacement varies. The motor has a fixed fluid displacement for each revolution thereof, when set in a selected adjusted position, and the speed of the motor with respect to the speed of the pump casing is determined by the relative displacement of the pump and the motor. Since the pump rotor is secured to the motor, the speed of the pump rotor and consequently the amount of liquid pumped per revolution of the pump casing is determined by the relative fluid displacement of the pump and the motor, per revolution thereof. Consequently the speed of rotation of the pump rotor is determined by the fluid displacement capacity of the motor, and since the driven shaft is secured to the pump rotor, the speed of the driven shaft is determined by the fluid receiving capacity of the motor, per revolution thereof. When a fixed speed reduction is desired, the fluid receiving capacity of the motor, per revolution thereof, may be fixed and when a variable speed is desired, the fluid receiving capacity of the motor per revolution thereof, is variable. The operating parts of the motor are secured to the driven shaft, so that the power produced by the motor is delivered to the driven shaft. There is thus transferred to the driven shaft the power due to the reaction of the rotor in the pump casing and the power developed in the motor, so that the power delivered to the driven shaft is substantially the same as that delivered by the driving shaft. Since the power of the driven shaft is substantially the same as that of the driving shaft, and since the speed of the driven shaft may be considerably less than the speed of the driving shaft, the torque of the driven shaft is greater than the torque of the driving shaft.

The apparatus of our invention comprises a driving shaft 2 which may be the crank shaft of an internal combustion engine or other prime mover. Secured to the driving shaft 2 is a flywheel 3, the web of which comprises the casing 4 of a rotary pump. The casing 4 comprises a side plate 5 which is bolted adjacent its center to the flange 6 of the driving shaft and which is bolted at its periphery to the rim of the flywheel 3. The rim of the flywheel constitutes the peripheral portion of the pump casing and the remainder of the casing comprises the side plate 7 which is bolted at its periphery to the rim of the flywheel 3. Formed integral with the side plate 7 is a valve member 8 which is journalled in and forms a tight running fit with the stationary casing 9. The casing 9 is provided with a flange 12 which is bolted or otherwise secured to a housing member 13, which is fixed to the engine or to some other stationary support. The side plate 7 is provided with inlet and outlet ports 15 and 14 which ports extend substantially semi-circumferentially on opposite sides of the vertical center line through the axis of rotation of the flywheel. In Figure 1, for the purpose of illustration, these ports have been displaced through angles of 90 degrees so that they lie above and below the axis of rotation of the flywheel, but this displacement has been done merely for the purpose of more clearly illustrating the construction and mode of operation of the apparatus.

The pump casing encloses a circular chamber which is eccentric to the axis of rotation of the casing. Disposed in this chamber and arranged concentrically with respect thereto and consequently eccentrically with respect to the axis of rotation of the driving shaft 2, is a ring rotor 16 which is journalled in the casing and forms fluid tight running fit with the side walls 5 and 7 and a running fit with the peripheral wall of the chamber. The ring rotor 16 is provided on its inner face with a series of regularly spaced teeth or convolutions 17, which are peculiarly shaped, as will be set forth hereinafter. The teeth or convolutions 17 comprise a series of regularly spaced curved crests, separated by similarly curved hollows, the hollow being the reverse of the crest.

Disposed within the pump casing and concentric with the axis of rotation of the driving shaft 2, is an inner rotor 18 which forms fluid tight running fit with the side walls of the pump casing and which is provided on its surface with alternate curved hollows and crests 19 which nest in the crests and hollows on the ring rotor 16. The number of crests or teeth 19 on the central rotor 18 is less than the number of crests 17 on the ring rotor 16, and in the present instance, the central rotor has one less tooth or crest than the ring rotor. The central rotor is eccentric with respect to the ring rotor and is in mesh therewith. The convoluted surfaces of the two rotors, are so formed that each tooth on each rotor contacts with a tooth on the other rotor, the line of successive contact of the successive teeth lying in a circle. Tooth shapes of this type are well known in the art. Rotor and ring gear tooth constructions of the types shown in patent numbered 1,505,707 issued August 19, 1924, French Patent numbered 481,799, and British Patent numbered 9,359 of 1915 are especially adapted for use in the present invention. The contact between the teeth of the two rotors forms a plurality of successive isolated pockets 21 between the two rotors and, as the rotors rotate, the volumes of these pockets are continually increasing and decreasing. During their increasing movement, the pockets move over the inlet port 14, so that they become filled with liquid and during their decreasing movement the pockets move over the outlet port 15 so that the liquid contained in the pockets is discharged through the outlet port as the volume of the pocket decreases. By this arrangement, a suitable pressure is produced in a given amount of space, thereby permitting the transmission of a large amount of power with a relatively small apparatus. As the pump casing rotates, the ring rotor, due to its eccentricity with respect to the central rotor, and due to the greater number of teeth on the ring rotor, progresses around the central rotor, varying the capacity of the pockets and thus pumping liquid. The rate of progression of the ring rotor is determined by the speed of the central rotor relative to the pump casing and, when the pump casing and the central rotor rotate at the same speed, there is no relative movement of the central rotor and the ring rotor.

The central rotor 18 is secured to the driven shaft 23 which is journalled in the pump casing the casing in turn being journalled in the stationary housing 9. The reaction of the rotation of the pump casing serves to rotate or tend to rotate the central rotor, the speed of rotation of the central rotor depending upon the load imposed on the driven shaft 23 and the freedom of discharge of liquid from the pump. By controlling the freedom of discharge of the liquid, the amount of power applied to the central rotor may be varied. Power reaction means are provided for controlling the freedom of discharge of the liquid from the pump and for causing the load imposed on the discharging liquid to do useful work in rotating the driven shaft.

The stationary housing 9 is provided at that part which surrounds the valve member 8 with a high pressure chamber 25 which extends substantially for 180 degrees around the axis of the driven shaft 23 and which is in continuous communication with the discharge port 15 of the pump through the conduit 26 formed in the valve member 8. The conduit 26 opens into an annular chamber 27 surrounding the driven shaft 23 and this chamber is provided with an annular outlet port 28, which, is always in communication with the high pressure chamber 25, regardless of the position of the rotary valve member 8.

The stationary casing 9 is also provided with a low pressure chamber 31 diametrically opposite to the high pressure chamber 25 and extending for substantially 180 degrees around the axis of the driven shaft 23. This low pressure chamber 31 is in communication, through the passageway 32 in the stationary casing, with an annular low pressure chamber 33 surrounding the driven shaft. The chamber 33 is provided with a 360 degree annular low pressure port 34 opening onto the face of the valve member 8 and such member is provided with an elongated port 35, preferably substantially semi-circular, which communicates with the inlet port 14 of the pump through the conduit 36 formed in the valve member 8. It is thus apparent that the low pressure chamber 31 is always in communication with the inlet port 14 of the pump, regardless of the position of the valve member. The low pressure chamber 33 is provided with a filling aperture 37 into which is screwed the discharge pipe of an elevated fluid reservoir, so that any depletion of the supply of fluid within the apparatus, by leakage or otherwise, is compensated for by the flow of fluid from the storage reservoir into the chamber 33.

Means are provided for short circuiting the pump so that it will do no useful work, as for instance, when it is desired to separate the engine from the driven shaft when the former is running and the vehicle standing or when it is desired to shift from forward to reverse, and vice versa, as is accomplished by the use of a friction clutch in standard automobile practice. This is accomplished by directly connecting the high pressure chamber 25 and the low pressure chamber 33 in the stationary casing 9, so that liquid will flow directly from the pump discharge port 15 to the pump inlet port 14. Disposed in the casing 9 between the high pressure chamber 25 and the low pressure chamber 33, is a rotary valve 38, having a passage 39 extending therethrough. Normally, this passage is in a position to prohibit the flow of liquid between the chambers 25 and 33, but when desired the valve may be rotated to cause the passage 39 to connect the chamber 25 and 33, thereby short circuiting the pump.

The stationary casing 9 is provided with a wall 41 disposed at right angles to the axis of rotation of the driven shaft 23 and this wall forms one of the side walls of the low pressure chamber 31 and the high pressure chamber 25. The wall 41 is provided at the low pressure chamber with an arcuate port 42 extending substantially semi-circumferentially about the axis of the driven shaft 23 and the high pressure chamber 25 is provided with a port 43 extending substantially semi-circumferentially about the axis of the driven shaft 23. Bearing against the opposite side of the wall 41 is the cylinder block of the fluid operated motor, such cylinder block comprising a plurality of regularly spaced circumferentially disposed cylinders 44, the axes of the cylinders being substantially parallel to the axis of the driven shaft 23. Each cylinder 44 is provided at the end which is in contact with the wall 41, with a port 45 through which fluid passes into and out of the cylinders. When the port 45 of a cylinder is in communication with the port 43 of the high pressure chamber 25, fluid is being introduced into the cylinder and, when the port 45 of a cylinder is in communication with the port 42 of the low pressure chamber 31, fluid is being discharged from the cylinder.

For clarity of illustration, i. e., in order that the ports 42 and 43 may be seen in Fig. 1 as establishing communication between the cylinders and the chambers 31 and 25 respectively, the ports 42 and 43 are shown shifted angularly through 90 degrees from their true positions. That is to say (see Fig. 5) the actual undistorted position of the ports 42 and 43 is such that their ends and the webs separating the latter are disposed adjacent a vertical longitudinal plane. This is not necessarily so in all devices but the arrangement is necessary in the present instance because of the fact that the backing plate of the motor is mounted on a horizontal axis. In all cases the semi-circular ports must be approximately bisected by a longitudinal plane passing through the axes of the backing plate trunnions, in order to secure proper timing of the fluid flow to and from the motor cylinders.

The cylinder block is connected to the driven shaft 23, so that it rotates in synchronism therewith.

Due to the difficulty of invariably securing accurate alinement of the axes of the rotating parts and accurate contact of the contacting faces, the cylinder block is preferably mounted so that it has a certain degree of freedom of movement, so that it may move to cause the end of the cylinder block to always remain in tight surface contact with the wall 41. This is accomplished by introducing a universal joint between the cylinder block and the driven shaft 23, so that the cylinder block has a certain degree of freedom of movement. The universal joint comprises an inner ring or collar 46, secured to the driven shaft 23. The collar is provided with radially extending pins 47 and arranged on each pin is a block 48 having parallel sides in contact with a slot formed in the hub 49 of the cylinder block. The blocks 48 are rotatable on the pins 47 and are provided with curved heads, concentric with the point of intersection of the axis of the driven shaft and the axis of the pins 47, so that the cylinder block is self aligning with respect to the valve plate 41. The cylinder block is normally pressed into tight engagement with the wall 41 by a coiled spring 51 bearing against the collar 52, slidably splined to the driven shaft and bearing against the hub 49 of the cylinder block. It is apparent from this construction that the cylinder block is driven synchronously with the driven shaft and is immovable circumferentially and radially with respect to the driven shaft but is permitted a limited adjustment as to alignment in a plane normal to the axis of the driven shaft, so that the cylinder block may move to conform its position to irregularities in construction or assembly or to irregularities due to wear of the parts.

Disposed in each cylinder 44 is a piston 53 and each piston is connected by means of a connecting rod 54 with a rotatable ring 55 suitably journalled on a backing plate 56. The ring 55 is connected by a universal joint 57 with a sleeve 58 secured to the driven shaft 23, so that the ring 55 moves synchronously with the driven shaft and with the cylinder block. As the pistons 53 are reciprocated by the liquid under pressure, the work done by the liquid is transferred to the rotatable ring 55 and thence to the driven shaft 23, so that the work done by the motor is not wasted. Since the relative speeds of the pump casing and the central rotor 18 are determined by the fluid displacement of the pump, per revolution thereof, and since the fluid displaced by the pump must pass through the motor, it is apparent that the relative speeds of the pump casing and consequently the driving shaft, and the central rotor and consequently the driven shaft, are determined by the displacement capacity of the motor cylinders per revolution of the driven shaft. With a fixed motor displacement the relative speed of the driving and driven shaft remains constant and, by varying the displacement capacity of the motor, per revolution thereof, the speed of the driven shaft may be varied with respect to the speed of the driving shaft. The displacement capacity of the motor may be varied by varying the stroke of the pistons 53 and, to accomplish this, the backing plate 56 is pivotally mounted in the housing 9, so that its angle with respect to the axis of the driven shaft 23 may be varied. The backing plate 56 is provided with trunnions 61 journalled in the housing 9, the axes of the trunnions lying in the plane of the centers of connection of the connecting rods 54 with the ring 55. Means are provided for rocking the backing plate 56 to any desired angle, to vary the fluid displacement capacity of the motor per rotation of the driven shaft. In the drawings, we have shown a lever 62 secured to one of the trunnions 61 for the purpose of swinging the backing plate 56 and the lever is preferably associated with a notched segment 63 with which a latch 64 on the lever cooperates to hold the backing plate at any selected angle. When the backing plate is perpendicular to the axis of the driven shaft 23, there will be no reciprocation of the pistons 53 and consequently the fluid displacement capacity of the motor will be reduced to zero. Consequently, no fluid may be discharged by the pump and consequently the pump casing and the central rotor must rotate together, so that the driven shaft is rotated at the same speed as the driving shaft.

As the backing plate 56 is inclined to a greater and greater degree, the fluid displacement capacity of the motor increases, consequently the speed of the driven shaft decreases with respect to the speed of the driving shaft and torque is increased on the driven shaft.

By inclining the backing plate 56 on the opposite side of its vertical position a reverse direction is obtained and the shaft 23 is caused to rotate counter clockwise. This is equivalent to causing the timing valve to revolve 180 degrees thereby reversing the high and low pressure ports and consequently the flow of fluid. By shifting the backing plate in this manner a reverse rotation may be obtained without changing the port relations.

In operation, when the shaft 23 is stationary and the clutch valve 38 is open the transmission is in neutral and for each rotation of the fly wheel ring rotor 16 of the pump will rotate a distance of one tooth with relation to the central rotor 18. When the clutch valve is closed fluid will be pumped into the motor cylinders causing rotation of the shaft 23. The central rotor 18 will rotate with shaft 23 and the relative rotation of the ring rotor and central rotor for each revolution of the fly-wheel will gradually decrease until the transmission comes into direct drive, when there will be no relative rotation between the rotors and the shaft 23 will be rotating at the same speed as the shaft 2. It will be seen, therefore, that a maximum pumping effect is obtained when the shaft 23 is stationary and as the shaft 23 speeds up in rotation the amount of fluid pumped will gradually decrease until in direct connection pumping of fluid has entirely ceased, and the motor pistons are at rest.

Having described a preferred embodiment of the invention, what is desired to be secured by Letters Patent and claimed as new is:

We claim:

1. In combination a driving shaft, a rotatable pump casing comprising fluid inlet and outlet ports secured to the driving shaft, a circular chamber in said casing disposed eccentrically with respect to the axis of rotation of the casing, a ring rotor journaled in said circular chamber; a central rotor in pumping engagement with said ring rotor and concentric with said driving shaft; means providing stationary ports in permanent communicating relation with said inlet and outlet ports; and means normally resisting the rotation of said central rotor.

2. The combination as set forth in claim 1 together with means for controlling the resistance of said last mentioned means.

3. In combination, a driving shaft, a rotatable pump casing comprising fluid inlet and outlet ports secured to said shaft; a circular chamber in said casing disposed eccentrically with respect to the axis of rotation of the casing, a ring rotor having a toothed inner surface journaled in said chamber; a central rotor having a toothed outer surface meshing with the ring rotor and disposed eccentrically with respect thereto, and a driven shaft concentric with the driving shaft and with the central rotor, secured to said central rotor.

4. In combination, a driving shaft, a pump casing embodying inlet and outlet ports secured to said shaft, a circular chamber in said casing disposed eccentrically with respect to the axis of rotation thereof, a ring rotor having a toothed inner surface journaled in the chamber, a central rotor having a toothed outer surface engaging the ring rotor, said ring rotor having one tooth more than the other rotor, said central rotor being disposed concentrically with respect to the driving shaft, stationary low and high pressure ports communicating with said inlet and outlet ports respectively, and a driven shaft secured to said central rotor.

5. In combination, a driving shaft, a pump casing secured to the driving shaft provided with inlet and outlet ports, said casing having a circular chamber therein disposed eccentrically with respect to the axis of rotation of the casing, a ring rotor journalled in said chamber and concentric therewith, a central rotor engaging the ring rotor and concentric with said driving shaft, said rotors embodying coacting means for pumping fluid during operation and means for controlling the speed of the central rotor with respect to the casing.

6. In combination, a driving shaft, a pump casing secured to the driving shaft provided with inlet and outlet ports, said casing having a circular chamber therein disposed eccentrically with respect to the axis of rotation of the casing, a ring rotor journalled in said chamber and concentric therewith, a central rotor embodying means in pumping engagement with the ring rotor and concentric with said driving shaft and means for varying the speed of rotation of the central rotor to vary the amount of fluid pumped per rotation of the pump casing.

7. In combination, a rotatable casing; an internal gear eccentrically journaled in said casing; a pinion journaled on the axis of rotation of said casing meshing with said internal gear; and diametrically opposite inlet and outlet ports formed in said casing in such relation to the eccentricity of said ring gear that fluid is continuously drawn into said inlet port and continuously discharged under pressure through said outlet port when relative rotation of said gear and pinion occurs.

8. The combination as set forth in claim 7 together with means for varying the relative rotation of said ring gear and said pinion independently of the rate of rotation of said pump casing.

9. In a power transmission apparatus, a driving member, a driven member; a pump driven by said driving member comprising a rotatable casing having a chamber therein disposed eccentrically with respect to the axis of rotation of said casing, a ring rotor journalled in said chamber and a central rotor in pumping engagement with said ring rotor, said central rotor being connected to said driven member and concentric with said driving member; and a fluid motor actuated by fluid delivered thereto by said pump driving said driven member.

10. In a power transmission apparatus; a driving shaft; a driven shaft; a pump comprising a rotatable casing secured to said driving shaft having a chamber therein disposed eccentrically with respect to the axis of rotation of said casing; a ring rotor journalled concentrically in said chamber; a central rotor in pumping engagement with said ring rotor, and disposed eccentrically with respect thereto, rotatable with said driven shaft and concentric with respect to said driving shaft; and a fluid motor actuated by fluid delivered thereto by said pump driving said driven shaft.

11. In combination, a driving shaft, a rotatable pump casing comprising fluid inlet and outlet ports secured to said shaft, a circular chamber in said casing disposed eccentrically with respect to the axis of rotation of the casing, a ring rotor having a toothed inner surface journalled in said chamber, a central rotor having a toothed outer surface meshing with the ring rotor and disposed eccentrically with respect thereto, a driven shaft concentric with the driving shaft and with the central rotor, secured to said central rotor; and a fluid motor actuated by fluid circulated therethrough from said ports and connected to said driven shaft to rotate therewith.

12. In a power transmission apparatus, a driving shaft, a pump casing secured to the driving shaft and provided with inlet and outlet ports, said casing having a circular chamber therein disposed eccentrically with respect to its axis of rotation, a ring rotor in said casing concentric with the chamber therein, a central rotor concentric with the axis of rotation of the casing in pumping engagement with said ring rotor, a fluid motor, conduits connecting the pump casing with the fluid motor, and a driven shaft connected to said motor and secured to said central rotor.

13. In a power transmission apparatus, a driving shaft, a pump casing secured to the driving shaft and provided with inlet and outlet ports, said casing having a circular chamber therein disposed eccentrically with respect to its axis of rotation, a ring rotor in said casing concentric with the chamber therein, a central rotor concentric with the axis of rotation of the casing in pumping engagement with said ring rotor, a fluid motor, conduits connecting the pump casing with the fluid motor, a driven shaft connected to the motor and secured to the central rotor, and a valve for directing the flow of fluid between the pump and the motor.

14. In a power transmission apparatus, a driving member, a pump casing driven by said driving member and provided with inlet and outlet ports, said casing having a circular chamber therein disposed eccentrically with respect to its axis of rotation, a ring rotor in said casing concentric with the chamber therein, a central rotor concentric with the axis of rotation of the casing in pumping engagement with said ring rotor, a fluid motor, conduits connecting the pump casing with the fluid motor, a driven member connected to the motor and said central rotor, and a valve rotatable in time with said pump casing for directing the flow of fluid between said pump and said motor.

15. In a power transmission apparatus, a driving member, a rotatable pump casing driven by said driving member and provided with inlet and outlet ports, said casing having a circular chamber therein disposed eccentrically with respect to its axis of rotation, a ring rotor in said casing concentric with the chamber therein, a central rotor concentric with the axis of rotation of the casing in pumping engagement with said ring rotor, a fluid motor, a rotatable valve member driven with said pump casing and having conduits therein for the flow of fluid between said pump casing and said motor, a chambered casing cooperating with said valve member and said motor, and a driven member connected to said motor and said central rotor.

16. In a power transmission apparatus, a driving member, a rotatable pump casing secured to said driving member and provided with inlet and outlet ports, said casing having a circular chamber therein disposed eccentrically with respect to its axis of rotation, a ring rotor in said casing concentric with the chamber therein, a central rotor concentric with the axis of rotation of said casing and in pumping engagement with said ring rotor, a fluid motor, conduits connecting said casing with the motor, a driven shaft connected to said motor and said central rotor, and means for varying the speed of rotation of said motor with respect to the speed of rotation of said pump casing.

17. In a power transmission apparatus, a driving member, a pump comprising a rotatable casing connected to said driving member and provided with inlet and outlet ports, said casing having a circular chamber therein disposed eccentrically with respect to its axis of rotation, a ring rotor in said casing concentric with the chamber therein, and a central rotor concentric with the axis of the casing and in pumping engagement with said ring rotor; a fluid motor, conduits connecting said pump with said motor, a driven member connected to said motor and said central rotor; and means for varying the volumetric capacity of said motor per cycle thereof whereby the relative speeds of said driving and driven members may be varied.

18. In a power transmission apparatus, a driving member, a rotatable pump casing driven by said driving member provided with inlet and outlet ports, said casing having a circular chamber therein disposed eccentrically with respect to the axis of rotation of the casing, a ring rotor journalled in said chamber and concentric with said driving member, a central rotor disposed within said ring rotor, said rotors having interengaged coacting pumping means, a driven member concentric with said driving member connected to said central rotor, a plurality of motor cylinders rotatable with said driven member, pistons in said cylinders connected to said driven member, and a valve for directing the flow of fluid between the pump and the motor cylinders.

19. In combination with a driving member, a flywheel in the form of a heavy rim secured to said driving member and having a central bore, fluid pumping elements mounted within said rim in nested surface engagement with said bore between the planes bounding the sides of said rim to form therewith a fluid pump, a fluid motor engaging the pump and flywheel assembly in alignment therewith, a shaft driven by said motor and projecting into said pump, and means for distributing fluid between said pump and said motor.

20. In combination, a driving shaft, a flywheel on said shaft, said flywheel having an eccentric internal chamber, a pumping element mounted in said eccentric chamber, a complemental pumping element disposed within said first named element in interengagement therewith to form a fluid pump, a fluid motor adjacent said pump to be driven thereby, a shaft driven by said motor and projecting through said pump in alignment with the driving shaft, and means for distributing fluid between said pump and said motor.

21. In combination with a flywheel assembly having a rim providing a central bore between the planes bounding the sides of the assembly, a driving shaft connected to and designed to support said flywheel assembly, fluid pumping elements centrally nested within said bore in surface engagement therewith, one of which elements is rotatable with said assembly, a driven shaft axially aligned with said driving shaft and projecting into engagement with another of said pumping elements, a fluid motor mounted adjacent said flywheel assembly in driving engagement with said driven shaft, and means for conveying the fluid delivered by said pumping elements to said motor to operate the latter, and for thereafter returning said fluid to the pumping elements.

22. In the combination defined in claim 21, said driven shaft being rotatable in unison with said last mentioned pumping element to form a differential pump and extending therethrough to be rotatably supported by said flywheel assembly.

23. In a hydraulic transmission apparatus, a driving member; a fluid pump connected to said driving member; a driven member; a fluid motor for actuating said driven member; and fluid receiving and distributing means disposed between said pump and said motor; said means comprising high and low pressure fluid reservoirs, and means designed to distribute fluid radially between said reservoirs and said pump and to distribute fluid longitudinally between said reservoirs and said motor.

24. In the apparatus defined in claim 23, said reservoirs being radially disposed relative to the axis of said driven member and of substantial volumetric capacity; a passageway formed between said reservoirs; and valvular means for opening and closing said passageway.

25. In the apparatus set forth in claim 23, said reservoirs being substantially aligned longitudinally between the pump and motor; and said fluid distributing means including a device radially disposed relative to said reservoirs; said device being provided with passages for radial communication with said reservoirs.

26. In the apparatus defined in claim 23, said low pressure reservoir being designed to transfer fluid into contact with the portion of said distributing means through an angle of 360° and to communicate with said motor through an angle of approximately 180°; and said high pressure reservoir being designed to communicate with said motor through an angle of approximately 180° and to communicate with a portion of said distributing means.

In testimony whereof, we have hereunto set our hands.

ALDEN GRANVILLE RAYBURN.
JAMES WAYNE SUMNER.
ELWYN M. RAYBURN.